(12) United States Patent
Weber

(10) Patent No.: US 6,789,777 B2
(45) Date of Patent: Sep. 14, 2004

(54) PIEZO SOLENOID ACTUATOR AND VALVE USING SAME

(75) Inventor: James R. Weber, Lacon, IL (US)

(73) Assignee: Caterpillar Inc, Peoria, IL (US)

( * ) Notice: Subject to any disclaimer, the term of this patent is extended or adjusted under 35 U.S.C. 154(b) by 72 days.

(21) Appl. No.: 10/308,209

(22) Filed: Dec. 2, 2002

(65) Prior Publication Data

US 2004/0104368 A1 Jun. 3, 2004

(51) Int. Cl.$^7$ .............................................. F16K 31/02
(52) U.S. Cl. ........................ 251/129.06; 251/129.1; 251/129.15; 310/311
(58) Field of Search .................... 257/129.06, 129.1, 257/129.15; 310/311, 328, 359

(56) References Cited

U.S. PATENT DOCUMENTS

| | | | |
|---|---|---|---|
| 4,344,743 A | | 8/1982 | Bessman et al. |
| 4,437,644 A | * | 3/1984 | Wilmers ................... 251/11 |
| 4,678,000 A | * | 7/1987 | Kushida ................. 251/129.1 |
| 4,759,528 A | * | 7/1988 | Morris ................. 251/129.06 |
| 5,772,181 A | * | 6/1998 | Robertson, III ........ 251/129.06 |
| 5,893,350 A | | 4/1999 | Timms |
| 5,979,786 A | | 11/1999 | Longman et al. |
| 6,047,945 A | * | 4/2000 | Grove et al. ........... 251/129.06 |
| 6,167,869 B1 | | 1/2001 | Martin et al. |
| 6,266,296 B1 | | 7/2001 | Miyazawa |
| 8,257,548 | | 7/2001 | Hiddessen et al. |
| 6,298,829 B1 | | 10/2001 | Welch et al. |
| 6,321,845 B1 | | 11/2001 | Deaton |
| 2002/0017833 A1 | | 2/2002 | Montuschi et al. |

* cited by examiner

*Primary Examiner*—John Bastianelli
(74) *Attorney, Agent, or Firm*—Liell & McNeil

(57) ABSTRACT

A combined piezo and solenoid actuator are on separate electrical circuits that are coupled via a transformer. The solenoid actuator includes a first set of electrical windings that are arranged as a transformer with a second set of electrical windings that are a portion of a piezo actuator. Current supplied to the solenoid causes a brief induced voltage in the piezo circuitry that causes the piezo stack to expand and push the actuator member with a relatively large force over a short distance. As the magnetic flux of the solenoid continues to build, it applies an electromagnetic force to the armature to push the actuator member through a second larger distance. The combined piezo solenoid actuator finds potential application in valves that require high initial opening forces but also travel distances much larger than that practical with a piezo acting alone.

20 Claims, 2 Drawing Sheets

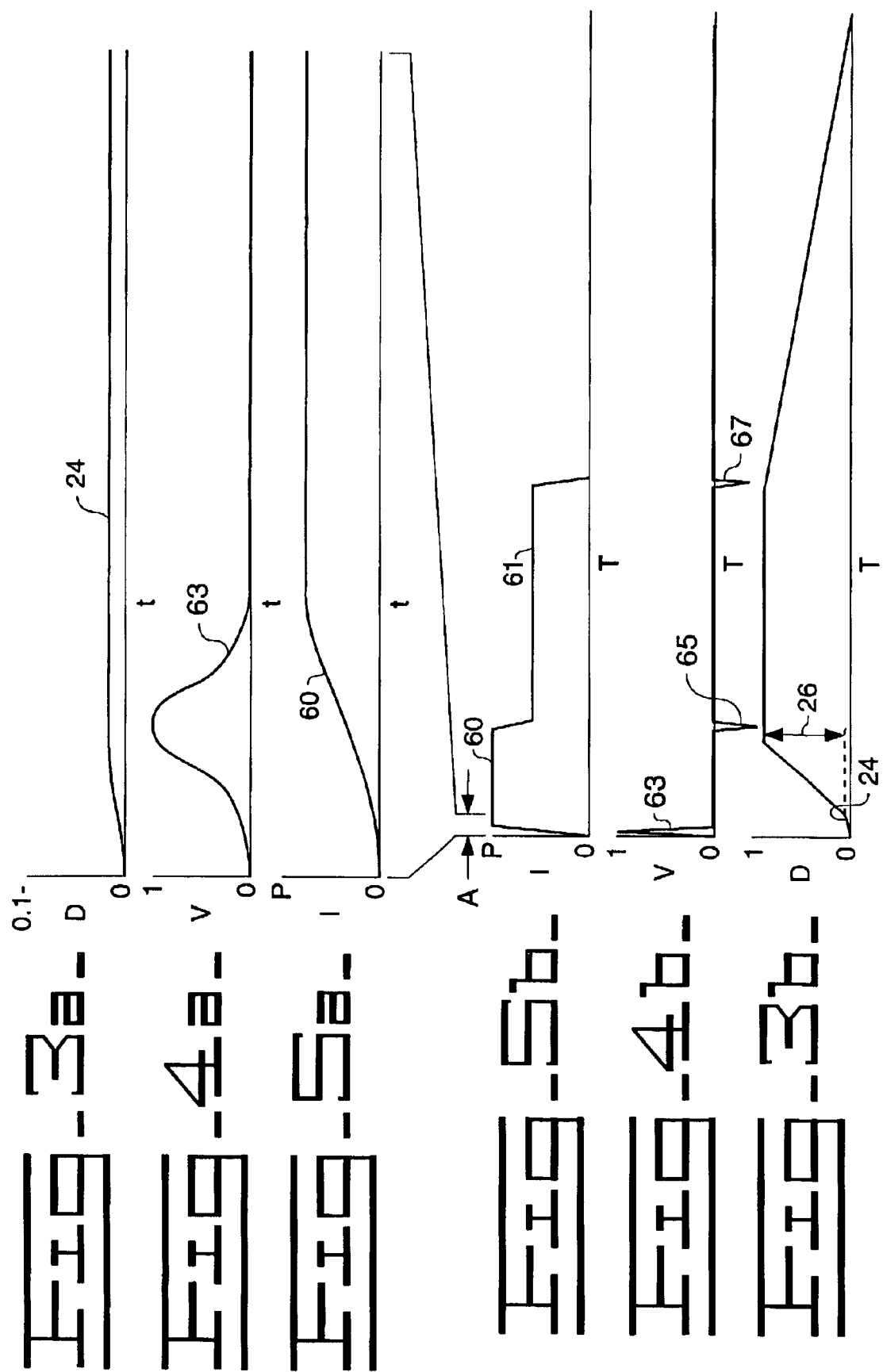

PIEZO SOLENOID ACTUATOR AND VALVE USING SAME

TECHNICAL FIELD

The present invention relates generally to a combined piezo solenoid actuator, and more particularly to actuators with a piezo electrically coupled to a solenoid via a transformer.

BACKGROUND

Electrically controlled actuators come in a wide variety of strengths, sizes, actuation distances, force profiles, etc. Different electrical actuators fall into a number of categories, including but not limited to solenoid actuators and piezo actuators, which can include benders and/or stacks. Solenoid actuators are often the choice when relatively large travel distances are required, whereas piezo actuators can be chosen when a relatively quick-acting high force over a short distance is desirable.

In relation to internal combustion engine technology, both solenoid actuators and piezo actuators have found a number of different applications. For instance, piezo actuators can find potential application in pressure switching valves associated with fuel injection systems. In addition, the usage of solenoid actuators has been widespread in relation to a variety of valves associated with fuel injection systems. There have also been recent trends in developing technology to electronically control the opening and closing of engine gas exchange valves, including intake valves, exhaust valves and/or engine compression release brake valves. Although electronically-controlled hydraulically-actuated gas exchange valve systems appear to show promise, a purely electrical actuator for actuating gas exchange valves has been elusive. Purely electrically actuated gas exchange valves have remained problematic at least in part because many gas exchange valves require relatively high initial opening forces coupled with relatively large travel distances.

SUMMARY OF THE INVENTION

In one aspect, an actuator includes a solenoid actuator that includes a first set of electrical windings and a moveable armature. A piezo actuator includes a second set of electrical windings and a deformable portion. The first set of electrical windings and the second set of electrical windings are arranged as a transformer.

BRIEF DESCRIPTION OF THE DRAWINGS

FIGS. 3a and 3b are graphs of valve member displacement verses time for a relatively brief and a longer time portion of a valving event;

FIGS. 4a and 4b are graphs of piezo actuator voltage versus time for the valving event of FIGS. 3a–b according to one embodiment of the invention; and FIGS. 5a–b are graphs of solenoid actuator current versus time for the valving event of FIGS. 3a–b according to one embodiment of the invention.

DETAILED DESCRIPTION

Figure 1:
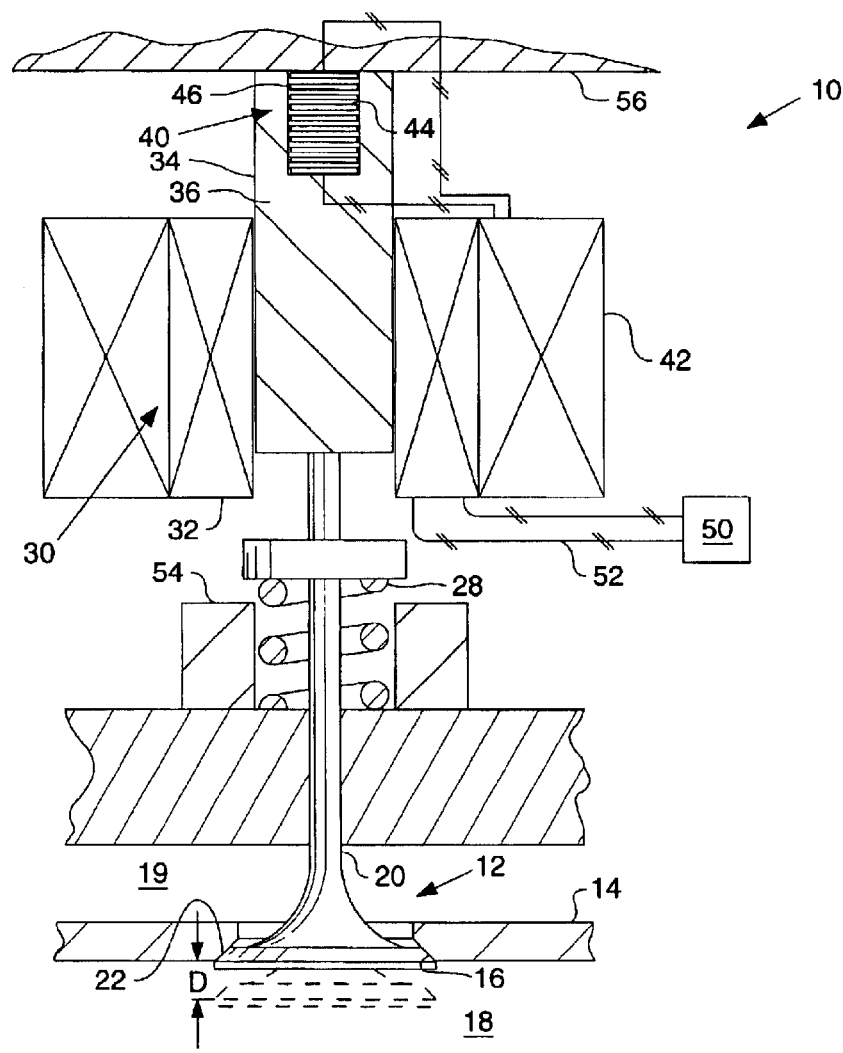
FIG. 1 is a sectioned side schematic illustration of a valve according to one embodiment of the present invention.

Referring to FIG. 1, a valve system 10 includes a valve 12 with a moveable valve member 20 positioned in a valve body 14 according to one embodiment of the invention. In the illustrated embodiment, valve system 10 represents an electronically-controlled electronically-actuated gas exchange valve for an internal combustion engine, although other types of valves may be used in other embodiments. For instance, valve member 20 moves from a position having a valve surface 22 in contact with a conical valve seat 16 to close a fluid passage 18 from a fluid passage 19. Fluid passage 18 could represent an engine cylinder, where as fluid passage 19 could represent either an intake passage or an exhaust passage. Valve member 20 is moveable to an open position as shown in shadow, where a valve surface 22 is a distance D away from valve seat 16 to open passage 18 to fluid passage 19, such as for either an intake or an exhaust valving event. When in a fully open position, valve member 20 is in contact with stop surface 54. As in a typical engine gas exchange valve, valve member 20 is biased toward its closed position by a biasing spring 28. Other biasers could be substituted for spring 28. Valve system 10 also includes an electronic control module 50 that controls the actuation of a solenoid actuator 30 and a piezo actuator 40 via signal communication line(s) 52. Specifically, electronic control module 50 includes a central processing unit with appropriate programming, and a current generator for supplying a current, which is preferably a direct current, to solenoid actuator 30.

The solenoid actuator 30 has a known structure that includes a first set of electrical windings 32 and a moveable armature 34 that includes a ferromagnetic portion 36. When current is supplied to first set of electrical windings 32 a magnetic force is applied to armature 34 in the direction toward opening valve 12. In other words, the magnetic force is in a direction to move valve surface 22 away from valve seat 16.

Piezo actuator 40 includes a second set of electrical windings 42 that are electrically coupled to apply a voltage across a deformable portion 44 that includes a piezo stack 46. Those skilled in the art will recognize that a piezo bender or other piezo structure could be substituted in place of stack 46 without departing from the intended scope of the invention. When a voltage is applied across piezo stack 46, it is arranged to lengthen in the direction of opening valve 12. In other words, a voltage across deformable portion 44 causes a force in a direction to move valve surface 22 away from valve seat 16. Those skilled in the art will appreciate that the length change in deformable portion 44 may be relatively small compared to the travel distance of armature 34 in solenoid actuator 30. The electrical circuit of the first set of electrical windings 32 associated with solenoid actuator 30 may be on a separate circuit from the second set of electrical windings 42 associated with piezo actuator 40. However, the first set of electrical windings 32 and the second set of electrical windings 42 may be arranged as a transformer such that a current change in first set of electrical windings 32 induces a voltage in the second set of electrical windings that is applied to the piezo stack 46. In some embodiments, the second set of electrical windings 42 includes many more turns than the first set of electrical windings 32 so that a voltage in solenoid actuator 30 is stepped up to a much higher voltage in piezo actuator 42.

Figure 2:
FIG. 2 is a graph of force versus travel distance for the actuator associated with the valve of FIG. 1 according to one embodiment of the invention.

Referring to FIG. 2, the force profile of valve system 10 according to one embodiment of the invention is illustrated over its travel distance D from its closed position to the open position as shown in shadow of FIG. 1. This graph shows a relatively high force over the beginning movement of the valve attributable to the piezo actuator 40 and a relatively steady but low force over a large distance attributable to the solenoid actuator 30. This force profile is ideally suited to gas exchange valves that sometimes must open against engine cylinder pressure. In other words, the high initial force provided by the piezo actuator 40 gets the valve member 20 moving and lifts the same a short distance off of valve seat 16. After the piezo actuator 40 gets the valve member moving by pushing off of body surface 56, the relatively lower force from solenoid actuator 30 carries valve member 20 to its fully open position as shown in shadow of FIG. 1.

Industrial Applicability

Although the present invention is illustrated in the context of a gas exchange valve actuator, the present invention could find potential application in any device using an electrical actuator. For example, the invention could be used in a fuel injector or an engine brake. Referring now to FIGS. 3a–5a, the beginning portion "A" of a valving event is illustrated according to one embodiment of the invention. FIG. 5a shows that a valving event is initiated by increasing the solenoid current from zero to its pull in level 60. FIG. 4a shows how the increase in current to the solenoid actuator 30 induces a voltage spike in the piezo actuator 40. This in turn causes the piezo stack 44 to increase in length and engage body surface 56 to push valve member 20 a first relatively short distance 24 away from valve seat 16. FIG. 2 shows that the piezo actuator 40 produces a relatively high force over a short distance 24, which can be needed to overcome the spring and cylinder pressure forces holding valve 12 closed.

FIGS. 3b–5b show the enlarged time period for the full valving event according to one embodiment of the invention. As shown in FIG. 3b, the first distance moved by the piezo actuator 40 is a relatively small portion of the overall travel distance of valve member 20. The voltage in the piezo actuator rapidly decays after the current in solenoid actuator 30 levels out at its pull in current level 60 as shown in FIG. 4b. As the current level builds in solenoid actuator 30, the magnetic flux builds around the first set of electrical windings, which begins to increase the electromagnetic force acting on armature 34. This includes a voltage spike 63 in the piezo circuitry. As the force level of the piezo actuator 40 drops, the force produced by the solenoid actuator increases to move the valve member as shown in FIG. 3b a second distance 26 to its fully open position as shown in shadow in FIG. 1. Shortly after the valve member reaches its fully open position, the solenoid actuator current can be dropped to a hold in level 61 in a conventional manner as shown in FIG. 5b. This change in current causes a brief voltage spike 65 in the piezo actuator 40, but it is of no consequence since the armature is well out of contact with body surface 56 at that time period. Shortly before the end of the valving event, current to solenoid actuator 30 is ended. When this occurs, biasing spring 28 pushes valve member 20 back toward its closed position that brings valve surface 22 back into contact with valve seat 16 to close passage 18 to passage 19. This change in current also causes a brief voltage spike 67 in the piezo electric actuator, which is also of no effect since valve 12 is in its open position when this occurs. When valve member 20 is in its closed position, armature 34 and deformable portion 46 of piezo actuator 40 are preferably just out of contact with body surface 56. Those skilled in the art will appreciate that it might be desirable to employ some lash adjustment strategy in order to improve the performance of the combined actuator in the specific valving application illustrated.

Those skilled in the art will appreciate that the embodiments of the illustrated device may combine several functions in a unique packaging arrangement. It may combine a high force piezo crystal stack 46 with an electric solenoid actuator 30. The piezo stack 46 may be integrated into the ferromagnetic armature 34 of the solenoid actuator 30. In other words, piezo stack 46 may be molded into armature 34, but could be operably coupled to valve member 20 in any number of ways. Those skilled in the art will appreciate that in some potential applications of the invention, the piezo stack is not connected or attached to the solenoid armature. The electric windings 32 of the solenoid actuator 30 are wound as a transformer with the second set of electrical windings that are part of the piezo circuitry. This inherently means that there may be first and second sets of electrical windings 32, 42. One set may be used to actuate the solenoid actuator 30 and the other may be to step up the voltage for activating the piezo stack 46.

Preferably, a DC voltage is applied to the solenoid actuator electrical windings 32 in order to apply a force to the armature through magnetic coupling. The voltage that was supplied to the solenoid windings will create a stepped up voltage in the second set of electrical windings 42 to the ratio of the number of windings. The DC voltage that is applied to the solenoid windings 32 will induce a transient voltage in the secondary windings 42, but it will rapidly decay after initial application since the current reaches a steady state level. The secondary electrical windings are connected to the two ends of the piezo stack that is preferably molded into the ferromagnetic portion of the solenoid armature. With the application of a voltage, the piezo stack will expand and create a large force acting through a short distance. As shown in the graphs, this force will decay rapidly in proportion to the decaying secondary voltage. If the resisting load is one that drops sharply after being moved a short distance, such as a gas exchange valve in an internal combustion engine, the solenoid can then move the valve member to its fully open position. Those skilled in the art will appreciate that this type of loading is indicative of a gas exchange valve, especially in a diesel engine.

It should be understood that the above description is intended for illustrative purposes only, and is not intended to limit the scope of the present invention in any way. For instance, it might be desirable to incorporate the second set of electrical windings into the armature in order to avoid moveable electrical connections. In addition, the transformer aspect of the invention could be separated from the coil for the solenoid such that the electric circuit for the solenoid could include two windings, one for the transformer and one for the electromagnet. Thus, those skilled in the art will appreciate that other aspects, objects, and advantages of the invention can be obtained from a study of the drawings, the disclosure and the appended claims.

What is claimed is:

1. An actuator comprising:
   a solenoid actuator including a first set of electrical windings and a moveable armature;
   a piezo actuator including a second set of electrical windings and a deformable portion;
   said first set of electrical windings and said second set of electrical windings being arranged as a transformer.

2. The actuator of claim 1 wherein said second set of electrical windings has more turns than said first set of electrical windings.

3. The actuator of claim 1 wherein said deformable portion of said piezo actuator is operably coupled to move said armature of said solenoid actuator.

4. The actuator of claim 3 wherein said deformable portion is joined to move with said armature.

5. The actuator of claim 4 wherein said deformable portion includes a piezo stack;

said armature include a ferromagnetic portion; and said piezo stack is molded into said ferromagnetic portion.

6. The actuator of claim 5 wherein said second set of electrical windings has more turns than said first set of electrical windings.

7. A method of moving a member, comprising the steps of:

moving the member a first distance at least in part by applying a voltage to a piezo actuator;

moving the member a second distance at least in part by supplying current to a solenoid actuator; and coupling said piezo actuator to said solenoid actuator at least in part via a transformer.

8. The method of claim 7 wherein said applying step includes a step of increasing current to said solenoid actuator.

9. The method of claim 7 wherein said coupling step includes a step of arranging a first set electrical windings and a second set of electrical windings as said transformer.

10. The method of claim 9 including the steps of:

electrically connecting said second set of electrical windings to a deformable portion of said piezo actuator; and connecting the member to an armature of the solenoid actuator.

11. The method of claim 7 including a step of opening a fluid passageway at least in part by moving the member.

12. The method of claim 11 wherein said member is moved out of contact with a valve seat when said member is moved said first distance.

13. The method of claim 12 wherein said member is moved to a position in contact with a stop when the member is moved said second distance.

14. The method of claim 13 wherein said applying step includes a step of increasing current to said solenoid actuator.

15. A valve comprising:

a valve body including a valve seat;

a valve member moveable between a first position in contact with said valve seat and a second position out of contact with said valve seat;

a piezo actuator operably coupled to move said valve member away from said valve seat; and a solenoid actuator operably coupled to move said valve member away from said valve seat; and said solenoid actuator including a first set of electrical windings arranged with a second set of electrical windings of said piezo actuator as a transformer.

16. The valve of claim 15 wherein said first set of electrical windings are electronically coupled to an armature of said solenoid actuator.

17. The valve of claim 15 wherein said valve seat is an annular valve seat.

18. The valve of claim 15 wherein said piezo actuator is operable to move said valve member a first distance; and said solenoid actuator is operable to move said valve member a second distance that is greater than said first distance.

19. The valve of claim 15 including a biaser operably coupled to bias said valve member toward said first position; and said piezo actuator and said solenoid actuator being operable to move said valve member toward said second position.

20. The valve of claim 15 wherein said piezo actuator includes a deformable portion attached to said valve member; and said solenoid actuator includes an armature attached to said valve member.

\* \* \* \* \*